(12) United States Patent
Jung et al.

(10) Patent No.: US 12,375,984 B2
(45) Date of Patent: *Jul. 29, 2025

(54) METHOD AND APPARATUS FOR LOGGING AND REPORTING RADIO LINK FAILURE INFORMATION IN NEXT-GENERATION MOBILE COMMUNICATION SYSTEM

(71) Applicant: Samsung Electronics Co., Ltd., Gyeonggi-do (KR)

(72) Inventors: Sangyeob Jung, Gyeonggi-do (KR); Soenghun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,625

(22) Filed: Jan. 26, 2024

(65) Prior Publication Data
US 2024/0172061 A1 May 23, 2024

Related U.S. Application Data

(63) Continuation of application No. 17/223,611, filed on Apr. 6, 2021, now Pat. No. 11,889,363.

(30) Foreign Application Priority Data

Apr. 8, 2020 (KR) .................. 10-2020-0043013

(51) Int. Cl.
*H04W 36/00* (2009.01)
*H04W 24/10* (2009.01)
(Continued)

(52) U.S. Cl.
CPC ....... *H04W 36/0079* (2018.08); *H04W 24/10* (2013.01); *H04W 36/0027* (2013.01); *H04W 76/15* (2018.02); *H04W 76/18* (2018.02)

(58) Field of Classification Search
CPC ............................... H04W 36/0079
See application file for complete search history.

(56) References Cited

U.S. PATENT DOCUMENTS

| | | | | |
|---|---|---|---|---|
| 11,889,363 B2* | 1/2024 | Jung | ............... | H04W 76/18 |
| 2013/0183908 A1* | 7/2013 | Jung | ............... | H04W 24/02 |
| | | | | 455/67.11 |

(Continued)

FOREIGN PATENT DOCUMENTS

KR   10-2020-0127405    11/2020

OTHER PUBLICATIONS

3GPP TS 36.331, 3rd generation partnership project, Radio resource control (RRC); protocol specification (release 16), Mar. 2020.
(Continued)

*Primary Examiner* — Pamit Kaur
(74) *Attorney, Agent, or Firm* — The Farrell Law Firm, P.C.

(57) ABSTRACT

The disclosure relates to a communication technique for combining an IoT technology with a 5G communication system for supporting a higher data transmission rate than a 4G system, and a system therefor. The disclosure can be applied to intelligent services (e.g., smart homes, smart buildings, smart cities, smart cars or connected cars, health care, digital education, retail businesses, security and safety-related services, etc.) based on 5G communication technologies and IoT-related technologies. The disclosure provides a method and an apparatus for logging and reporting information relating to a radio link failure. The method includes receiving, from a first base station that operates based on a first RAT, a UE information request including information indicating whether the terminal reports an RLF; and transmitting, to the first base station, a UE information response (Continued)

including an RLF report, in response to the information indicating a reporting of the terminal for the RLF.

20 Claims, 11 Drawing Sheets

(51) Int. Cl.
  *H04W 76/15* (2018.01)
  *H04W 76/18* (2018.01)

(56) References Cited

U.S. PATENT DOCUMENTS

| | | |
|---|---|---|
| 2013/0242898 A1* | 9/2013 | Johansson ............ H04W 24/02 370/329 |
| 2019/0306764 A1 | 10/2019 | Da Silva |
| 2020/0015110 A1 | 1/2020 | Tamura |
| 2021/0211945 A1 | 7/2021 | Rugeland |
| 2021/0266802 A1 | 8/2021 | Arshad |

OTHER PUBLICATIONS

3GPP TS 38.331, Technical specification group radio access network; NR Radio resource control (RRC) protocol specification (release 16) Mar. 2020.

* cited by examiner

METHOD AND APPARATUS FOR LOGGING AND REPORTING RADIO LINK FAILURE INFORMATION IN NEXT-GENERATION MOBILE COMMUNICATION SYSTEM

CROSS-REFERENCE TO RELATED APPLICATION(S)

This application is a continuation of U.S. application Ser. No. 17/223,611, which was filed in the U.S. Patent and Trademark Office on Apr. 6, 2021, and claims priority under 35 U.S.C. § 119 to Korean Patent Application No. 10-2020-0043013, filed on Apr. 8, 2020, in the Korean Intellectual Property Office, the entire disclosure of which is incorporated herein by reference.

BACKGROUND

1. Field

The disclosure relates generally to a method and an apparatus for logging and reporting information regarding radio link failure.

2. Description of Related Art

To meet the increasing demand for wireless data traffic since deployment of $4^{th}$ generation (4G) communication systems, efforts have been made to develop an improved $5^{th}$ generation (5G) or pre-5G communication system. The 5G or pre-5G communication system may also be called a "beyond 4G network" or a "post long term evolution (LTE) system".

The 5G communication system is intended to be implemented in higher frequency (mmWave) bands, e.g., 60 GHz bands, in order to accomplish higher data rates. To decrease propagation loss of the radio waves and increase the transmission distance, beamforming, massive multiple-input multiple-output (MIMO), full dimensional MIMO (FD-MIMO), array antennas, analog beam forming, and large scale antenna techniques are being discussed in 5G communication systems. In addition, in 5G communication systems, development for system network improvement is under way based on advanced small cells, cloud radio access networks (RANs), ultra-dense networks, device-to-device (D2D) communication, wireless backhaul, moving networks, cooperative communication, coordinated multi-points (COMP), reception-end interference cancellation, etc.

In the 5G system, hybrid frequency shift keying (FSK) and quadrature amplitude modulation (QAM) (FQAM) and sliding window superposition coding (SWSC) have been developed as types of advanced coding modulation (ACM), and filter bank multi carrier (FBMC), non-orthogonal multiple access (NOMA), and sparse code multiple access (SCMA) have been developed as types of advanced access technologies.

The Internet is evolving to the Internet of things (IOT), in which distributed entities, i.e., things, exchange and process information without human intervention. The Internet of everything (IoE), which is a combination of IoT technology and big data processing technology through a connection with a cloud server, has also emerged.

As technology elements, such as "sensing technology", "wired/wireless communication and network infrastructure", "service interface technology", and "security technology" have been demanded for IOT implementation, a sensor network, a machine-to-machine (M2M) communication, machine type communication (MTC), etc., have been researched.

An IoT environment may provide intelligent Internet technology services that collect and analyze data generated among connected things. IT may be applied to a variety of fields including smart homes, smart buildings, smart cities, smart cars or connected cars, smart grids, health care, smart appliances, and advanced medical services through convergence and combination between existing information technology (IT) and various industrial applications.

In line with this, various attempts have been made to apply 5G communication systems to IoT networks. For example, technologies such as sensor networks, MTC, and M2M communication may be implemented by beamforming, MIMO, and array antennas. Application of a cloud RAN as the above-described big data processing technology may also be considered an example of a convergence of 5G technology with IoT technology.

When a network is constructed or optimized, a mobile communication operator may configure a terminal to measure signal strength in an expected service area in order to arrange or re-adjust base stations in the service area. In addition to the measured signal strength, if a radio link has failed for a reason, the terminal may log and report information regarding the radio link failure as configured by a base station.

SUMMARY

An aspect of the disclosure is to provide a method and an apparatus wherein, in connection with logging information regarding a radio link failure, suitable information can be logged for a type of a core to which a terminal is connected.

Another aspect of the disclosure is to provide a method and an apparatus wherein, even if information regarding multiple cores is transferred, a terminal can log and report suitable information for a type of a core to which the terminal is connected.

In accordance with an aspect of the disclosure, a method is provided for a terminal in a wireless communication system. The method includes receiving, from a first base station of a first radio access technology (RAT), a user equipment (UE) information request message; and in case that the UE information request includes information indicating the terminal to transmit a radio link failure (RLF) report, transmitting, to the first base station of the first RAT, a UE information response message including the RLF report, the RLF report including logging information for a cell of a second RAT, and the cell being where the RLF is detected or being a source cell of a failed handover. The logging information includes a public land mobile network (PLMN) identity identified based on a first PLMN entry of a PLMN identity list, the PLMN identity list corresponding to a core network of the second RAT to which the cell is connected. The PLMN identity list is included in system information received from a second base station associated with the cell.

In accordance with another aspect of the disclosure, a method is provided for a first base station of a first RAT in a wireless communication system. The method includes transmitting, to a terminal, a UE information request message; and in case that the UE information request includes information indicating the terminal to transmit an RLF report, receiving, from the terminal, a UE information response message including the RLF report, the RLF report including logging information for a cell of a second RAT, and the cell being where the RLF is detected or being a source cell of a failed handover. The logging information includes a PLMN identity identified based on a first PLMN entry of a PLMN identity list, the PLMN identity list corresponding to a core network of the second RAT to which the cell is connected. The PLMN identity list is included in system information transmitted from a second base station associated with the cell to the terminal.

In accordance with another aspect of the disclosure, a terminal is provided for use in a wireless communication system. The terminal includes a transceiver; and a controller configured to control the transceiver to receive, from a first base station of a first RAT, a UE information request message, and in case that the UE information request includes information indicating the terminal to transmit an RLF report, control the transceiver to transmit, to the first base station of the first RAT, a UE information response message including the RLF report, the RLF report including logging information for a cell of a second RAT, and the cell being where the RLF is detected or being a source cell of a failed handover. The logging information includes a PLMN identity identified based on a first PLMN entry of a PLMN identity list, the PLMN identity list corresponding to a core network of the second RAT to which the cell is connected. The PLMN identity list is included in system information received from a second base station associated with the cell.

In accordance with another aspect of the disclosure, a first base station of a first RAT is provided for use in a wireless communication system. The first base station includes a transceiver; and a controller configured to control the transceiver to transmit, to a terminal, a UE information request message, and in case that the UE information request includes information indicating the terminal to transmit an RLF report, control the transceiver to receive, from the terminal, a UE information response message including the RLF report, the RLF report including logging information for a cell of a second RAT, and the cell being where the RLF is detected or being a source cell of a failed handover. The logging information includes a PLMN identity identified based on a first PLMN entry of a PLMN identity list, the PLMN identity list corresponding to a core network of the second RAT to which the cell is connected. The PLMN identity list is included in system information transmitted from a second base station associated with the cell to the terminal.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, etc., are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project (3GPP) LTE standards for the convenience of description. However, the disclosure is not limited by these terms and names, and may be applied in the same way to systems that conform other standards. In the disclosure, the term "eNB" may be interchangeably used with the term "gNB". That is, a base station described as an eNB may also indicate a gNB.

Figure 1:
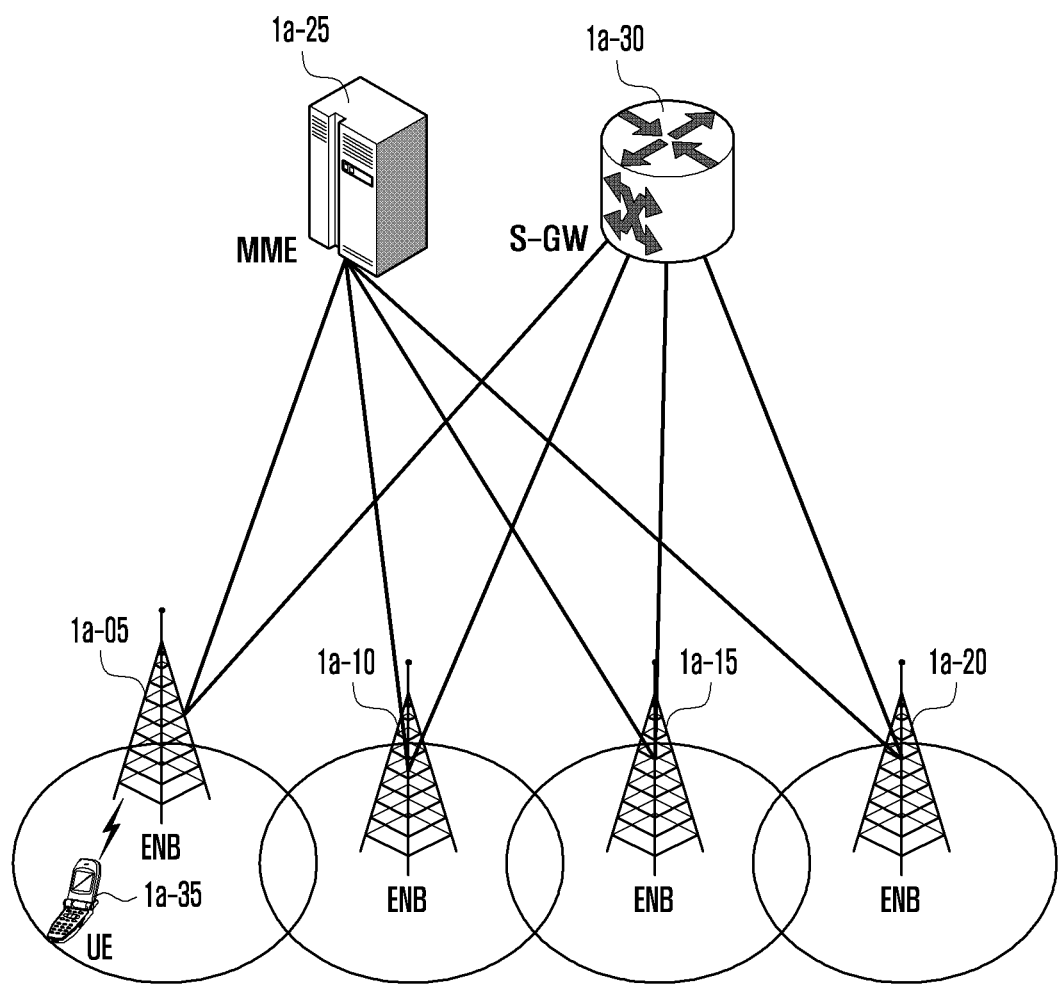
FIG. 1 illustrates an LTE system according to an embodiment.

FIG. 1 illustrates an LTE system according to an embodiment.

Referring to FIG. 1, a RAN of an LTE system includes next generation base stations (also referred to as evolved node Bs (eNBs), node Bs, or base stations) 1a-05, 1a-10, 1a-15, and 1a-20, a mobility management entity (MME) 1a-25, and a serving gateway (S-GW) 1a-30. A UE or terminal 1a-35 accesses an external network through the eNBs 1a-05 to 1a-20 and S-GW 1a-30.

In FIG. 1, the eNBs 1a-05 to 1a-20 correspond to an existing node B of a universal mobile telecommunication system (UMTS) system. The eNBs are connected to the UE 1a-35 through a radio channel, and perform a more complicated role than the existing node B. In the LTE system, since all user traffic including a real-time service, such as voice over Internet protocol (IP) (VOIP), are serviced through a shared channel, a device that performs scheduling by collecting state information, such as buffer states, available transmit power states, and channel states of UEs, is required, and eNBs 1a-05 to 1a-20 are in charge of such a function of the device.

In general, one eNB controls a plurality of cells. In order to implement a transmission rate of 100 Mbps, the LTE system uses an orthogonal frequency division multiplexing (OFDM) as a RAT in the bandwidth of 20 MHZ. In addition, the LTE system adopts an adaptive modulation & coding (AMC) scheme for determining a modulation scheme and a channel coding rate based on the channel state of the UE 1a-35. The S-GW 1a-30 is a device for providing a data bearer and generating or removing a data bearer under a control of the MME 1a-25. The MME 1a-25 is in charge of various control functions in addition to a mobility management function for the UE 1a-35, and is connected to a plurality of base stations.

Figure 2:
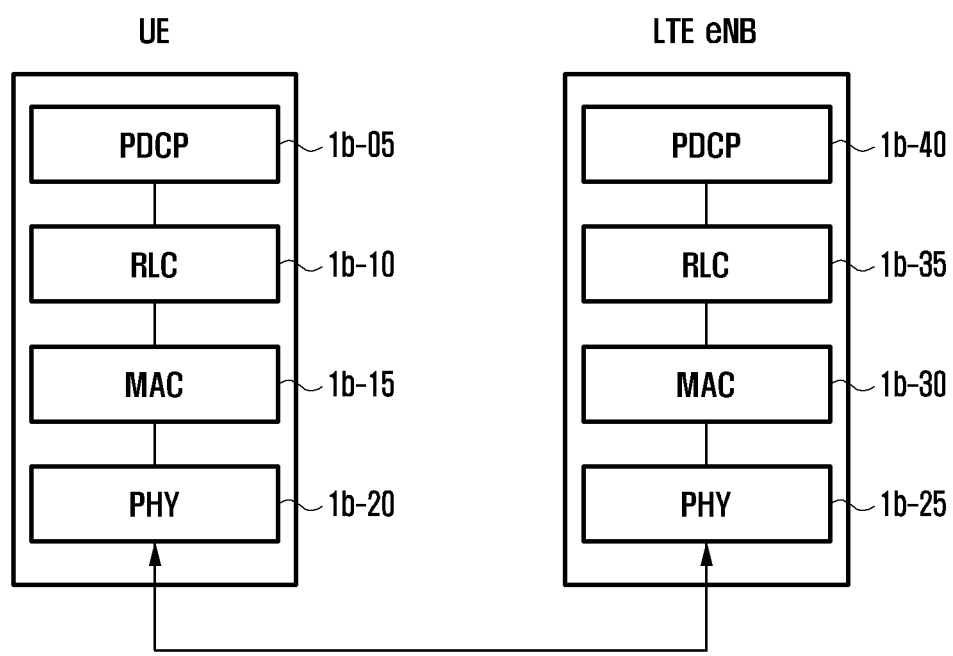
FIG. 2 illustrates a radio protocol architecture in an LTE system according to an embodiment.

FIG. 2 illustrates a radio protocol architecture in an LTE system according to an embodiment.

Referring to FIG. 2, the radio protocol of the LTE system includes packet data convergence protocols (PDCPs) 1b-05 and 1b-40, radio link controls (RLCs) 1b-10 and 1b-35, and medium access controls (MACs) 1b-15 and 1b-30, in a UE and an eNB, respectively. The packet PDCPs 1b-05 and 1b-40 perform operations, such as IP header compression/restoration. Functions of the PDCPs 1b-05 and 1b-40 may be summarized as follows:

Header compression and decompression: robust header compression (ROHC) only
Transfer of user data
In-sequence delivery of higher layer packet data units (PDUs) in a PDCP re-establishment procedure for RLC acknowledged mode (AM)
Sequence reordering function (For split bearers in dual connectivity (DC) (only support for RLC AM): PDCP PDU routing for transmission and PDCP PDU reordering for reception)
Duplicate detection of lower layer service data units (SDUs) in a PDCP re-establishment procedure for RLC AM
Retransmission of PDCP SDUs at a handover and, for split bearers in DC, of PDCP PDUs in a PDCP data-recovery procedure for RLC AM
Ciphering and deciphering
Timer-based SDU discard function in uplink RLCs 1b-10 and 1b-35 may reconfigure a PDCP PDU in a suitable size and perform an automatic repeat request (ARQ) operation. Functions of RLCs 1b-10 and 1b-35 may be summarized as follows:

Transfer of higher layer PDUs
ARQ function (Error Correction through ARQ (only for AM data transfer))
Concatenation, segmentation, and reassembly of RLC SDUs (only for unacknowledged mode (UM) and AM data transfer)
Re-segmentation of RLC data PDUs (only for AM data transfer))
Reordering of RLC data PDUs (only for UM and AM data transfer))
Duplicate detection (only for UM and AM data transfer)
Protocol error detection (only for AM data transfer)
RLC SDU discard (only for UM and AM data transfer)
RLC re-establishment The MACs 1b-15 and 1b-30 are connected to multiple RLC layer devices configured in one UE, and may perform multiplex RLC PDUs with a MAC PDU and demultiplex the RLC PDUs from the MAC PDU. Functions of the MAC MACs 1b-15 and 1b-30 may be summarized as follows:

Mapping between logical channels and transport channels
Multiplexing/demultiplexing of MAC SDUs belonging to one or different logical channels into/from transport blocks (TBs) delivered to/from the physical layer on transport channels
Scheduling information reporting
Error correction through hybrid automatic repeat request (HARQ)
Priority handling between logical channels of one UE
Priority handling between UEs by means of dynamic scheduling
Multimedia broadcast multicast services (MBMS) service identification
Transport format selection
Padding Physical layers 1b-20 and 1b-25 may perform operations of channel coding and modulating higher layer data, generating the higher layer data into an OFDM symbol, transmitting the OFDM symbol through a radio channel, and/or demodulating an OFDM symbol received through a radio channel, channel-decoding the OFDM symbol, and transmitting the OFDM symbol to a higher layer.

Figure 3:
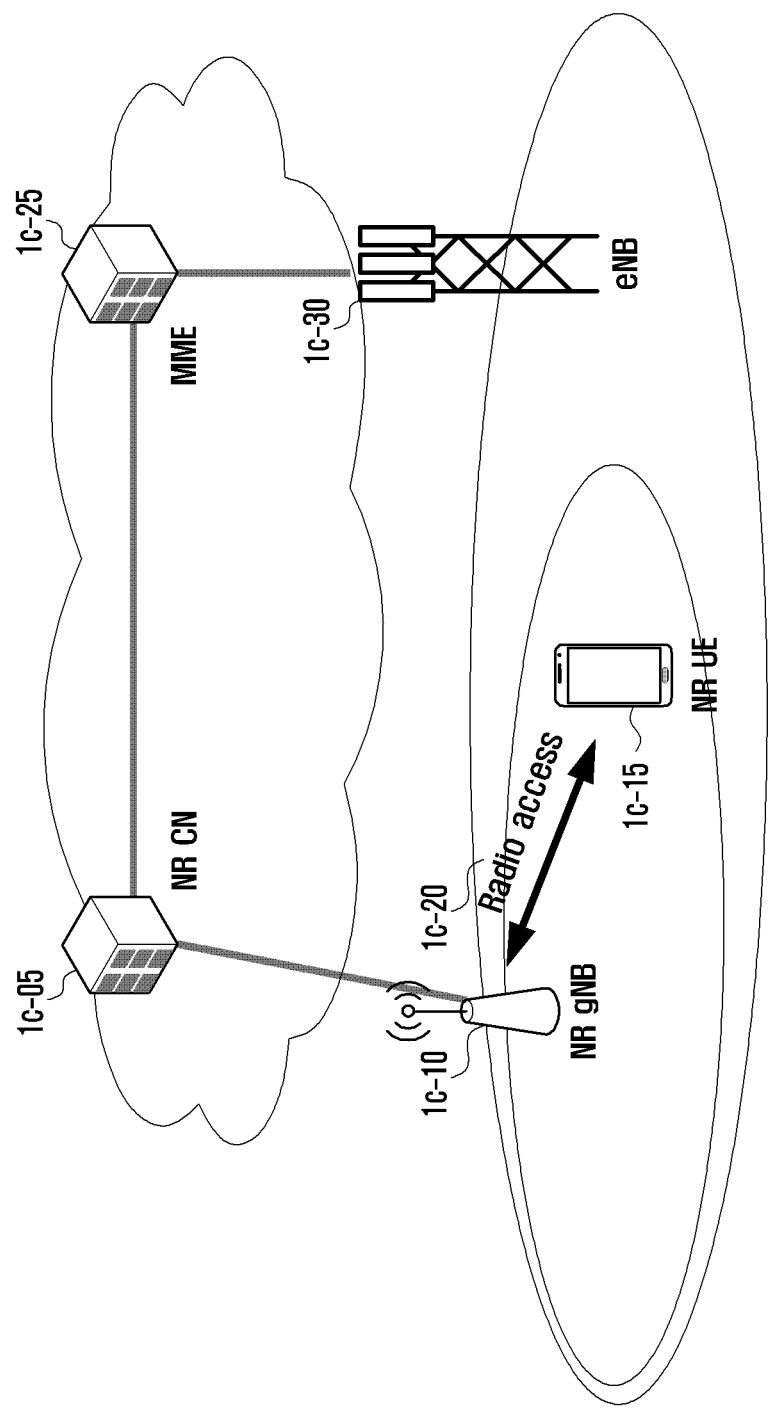
FIG. 3 illustrates a next generation mobile communication system according to an embodiment.

FIG. 3 illustrates a next generation mobile communication system according to an embodiment.

Referring to FIG. 3, a RAN of a next generation mobile communication system (e.g., NR or 5G) includes a next generation base station (also referred to as an NR gNB or an NR base station) 1c-10 and an NR core network (NR CN) 1c-05. An NR UE or a terminal 1c-15 accesses an external network via NR gNB 1c-10 and NR CN 1c-05.

In FIG. 3, the NR gNB 1c-10 corresponds to an eNB of the existing LTE system. The NR gNB 1c-10 is connected to the NR UE 1c-15 via a radio channel and may provide better service than the existing node B. In the next generation mobile communication system, since all types of user traffic are serviced through a shared channel, there is a need for a device for performing scheduling by collecting state information, such as buffer states, available transmission power states, and channel states of UEs. The NR gNB 1c-10 is in charge of such functions.

In general, the NR gNB 1c-10 controls a plurality of cells. In order to implement ultra-high speed data transmission as compared to the existing LTE, the NR gNB 1c-10 may have the existing maximum bandwidth or more, and may additionally employ a beamforming technology using an OFDM as a RAT. In addition, the NR gNB 1c-10 adopts an AMC scheme that determines a modulation scheme and a channel coding rate based on the channel state of the NR UE 1c-15. The NR CN 1c-05 performs functions, such as mobility support, bearer configuration, quality of service (QOS) configuration, etc. The NR CN 1c-05 is in charge of various control functions in addition to a mobility management function for the NR UE 1c-15, and may be connected to a plurality of base stations. In addition, the next generation mobile communication system may also operate in conjunction with the existing LTE system, and the NR CN 1c-05 is connected to an MME 1c-25 via a network interface. The MME 1c-25 is connected to an eNB 1c-30, i.e., the existing base station.

Figure 4:
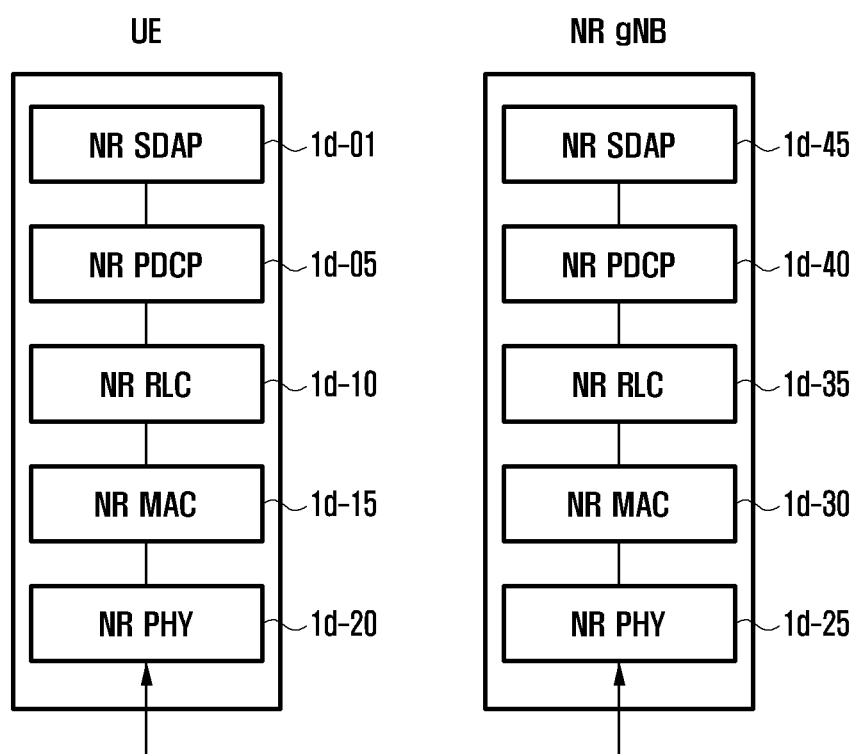
FIG. 4 illustrates a radio protocol architecture of a next generation mobile communication system according to an embodiment.

FIG. 4 illustrates a radio protocol architecture of a next generation mobile communication system according to an embodiment.

Referring to FIG. 4, the radio protocol of the next generation mobile communication system includes NR service data adaptation protocols (SDAPs) 1d-01 and 1d-45, NR PDCPs 1d-05 and 1d-40, NR RLCs 1d-10 and 1d-35, and NR MACs 1d-15 and 1d-30, respectively, in a UE and an NR base station.

Functions of the NR SDAPs 1d-01 and 1d-45 may include some of the following functions:

Transfer of user plane data

Mapping between a QoS flow and a data bearer, such as a dedicated radio bearer (DRB), for both uplink (UL) and downlink (DL)

Marking QoS flow identifiers (IDs) in both UL and DL packets

Mapping reflective QoS flow to data bearer for UL SDAP PDUs.

With respect to the SDAP layer device, a UE may receive a configuration, such as whether to use the header of an SDAP layer device or the function of the SDAP layer device, through an RRC message, for each PDCP layer device, for each bearer, or for each logical channel. If the SDAP header is configured, the UE may be indicated to update or reconfigure mapping information between a QoS flow and a data bearer for the uplink and downlink, through a non-access stratum (NAS) QoS reflection configuration 1-bit indicator (NAS reflective QoS) and access stratum (AS) QOS reflection configuration 1-bit indicator (AS reflective QoS) of the SDAP header. The SDAP header may include QoS flow ID information indicating QoS. The QoS information may be used as data processing priority, scheduling information, and the like to support a smooth service.

Functions of the NR PDCPs 1d-05 and 1d-40 may include some of the following functions.

Header compression and decompression (ROHC only)

Transfer of user data

In-sequence delivery of higher layer PDUs

Out-of-sequence delivery of higher layer PDUs

PDCP PDU reordering for reception

Duplicate detection of lower layer SDUs

Retransmission of PDCP SDUs

Ciphering and deciphering

Timer-based SDU discard in uplink

The reordering function of the NR PDCP devices 1d-05 and 1d-40 refers to a function of sequentially reordering PDCP PDUs, received from a lower layer, based on a PDCP sequence number (SN), and may include a function of transmitting data to a higher layer in the sequence of reordering, a function of directly transmitting data to a higher layer without taking the sequence into consideration, a function of reordering the sequence and logging missing PDCP PDUs, a function of providing a state report on the missing PDCP PDUs to a transmission side, and a function of requesting retransmission for the missing PDCP PDUs.

Functions of the NR RLCs 1d-10 and 1d-35 may include some of the following functions.

Transfer of higher layer PDUs

In-sequence delivery of higher layer PDUs

Out-of-sequence delivery of higher layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC devices 1d-10 and 1d-35 refers to a function of transmitting RLC SDUs, received from a lower layer, to a higher layer in the sequence of reception, and may include, if the original one RLC SDU is segmented into multiple RLC SDUs and received, a function of reassembling and transmitting the multiple RLC SDUs. The in-sequence delivery function may include a function of reordering the received RLC PDUs based on an RLC SN or PDCP SN, reordering the sequence and logging missing RLC PDUs, providing a state report on the missing RLC PDUs to a transmission side, and requesting retransmission for the missing RLC PDUs.

Alternatively, the in-sequence delivery function of the NR RLC devices 1d-10 and 1d-35 may include a function of sequentially transmitting only the RLC SDUs prior to the missing RLC SDU to a higher layer if the missing RLC SDU occurs, or sequentially transmitting all the RLC SDUs received before a timer starts to a higher layer if the timer expires although there is a missing RLC SDU, or sequentially transmitting all RLC SDUs received so far, to a higher layer, if a predetermined timer expires, although there is a missing RLC SDU.

In addition, the RLC PDUs may be processed in the sequence that the RLC PDUs are received (in the sequence of arrival regardless of the sequence of serial number and sequence number), and be transmitted to a PDCP device out-of-sequence delivery. The in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layers 1d-10 and 1d-35 may not include a concatenation function, and the concatenation function may be performed by the NR MAC layers 1d-15 and 1d-30 or may be replaced by a multiplexing function of the NR MAC layers 1d-15 and 1d-30.

The out-of-sequence delivery function of the NR RLC devices 1d-10 and 1d-35 refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and logging the missing RLC PDUs.

The NR MACs 1d-15 and 1d-30 may be connected to multiple NR RLC layer devices 1d-10 configured in one UE. Functions of the NR MACs 1d-15 and 1d-30 may include some of the following functions.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR PHY layers 1d-20 and 1d-25 may perform operations of channel-coding and modulating higher layer data, generating the higher layer data into an OFDM symbol, transmitting the OFDM symbols via a radio channel, and/or demodulating and channel decoding of the OFDM symbols received via the radio channel, and transferring the OFDM symbol to a higher layer.

Figure 5:
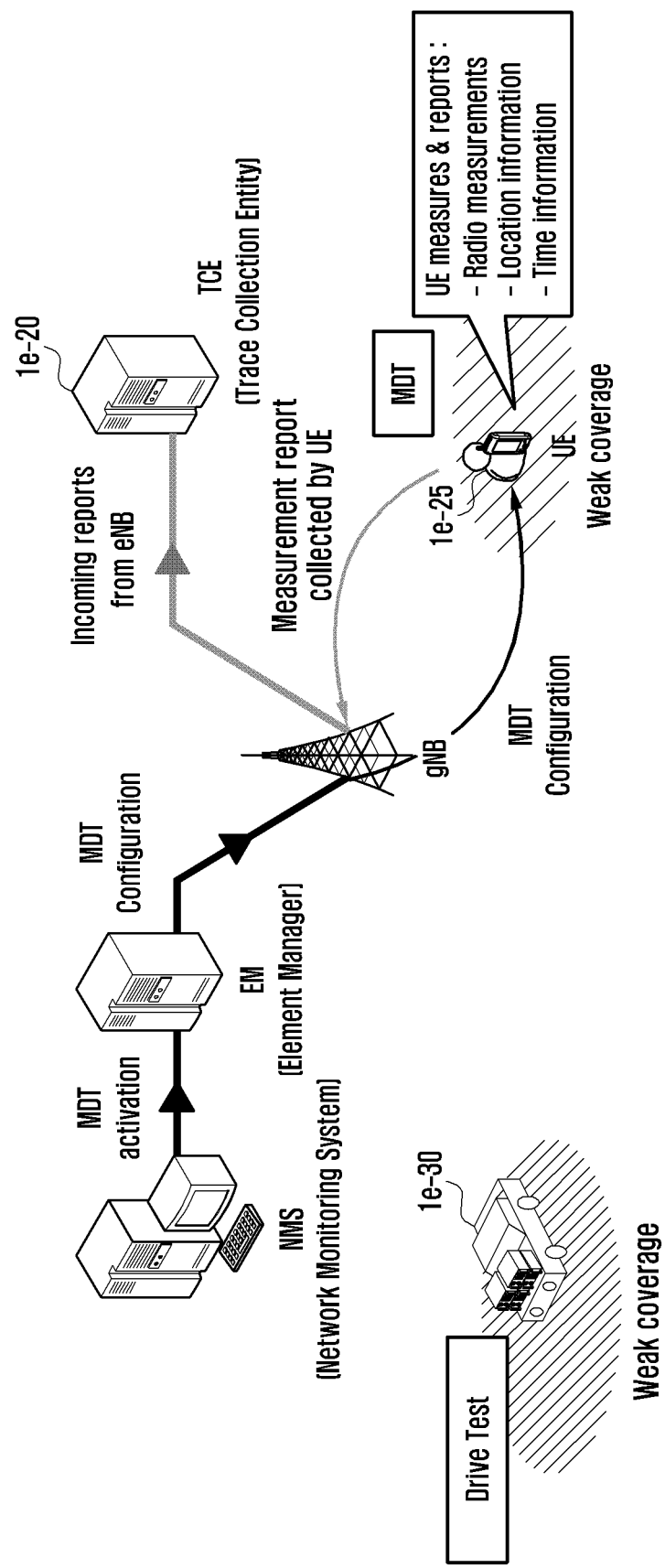
FIG. 5 illustrates collecting and reporting cell measurement information according to an embodiment.

FIG. 5 illustrates collecting and reporting cell measurement information according to an embodiment.

Referring to FIG. 5, when establishing or optimizing a network, a mobile communication service provider generally measures a signal strength in an expected service area, and performs a process of deploying or re-adjusting base stations 1e-15 in the service area based on the measurement. The service provider loads signal measurement equipment into a vehicle 1e-30 and collects cell measurement information in the service area, which is time-consuming and expensive. The above process is generally performed using a vehicle, and thus, is commonly called a "drive test".

The UE 1e-25 is equipped with a function for measuring a signal with respect to the base station 1e-15 in order to support operations such as cell reselection, handover, and serving cell addition when moving between cells. Therefore, instead of the drive test, the UE 1e-25 in the service area can be utilized, and the test using the UE 1e-25 may be referred to as a "minimization of drive test (MDT)".

The service provider may be configured to perform the MDT operation using specific UEs through various configuration devices of a network, and the UEs collect and store signal strength information from the serving cell and neighboring cells in an RRC connected mode (RRC_CONNECTED), an RRC idle mode (RRC_IDLE), or an RRC inactive mode (RRC_INACTIVE). In addition, the UEs store various information such as location information, time information, and signal quality information. The stored information may be reported to the network and transmitted to a specific server when the UEs are in a connected mode.

The MDT operation may be classified into an immediate MDT and a logged MDT as shown in Table 1 below.

TABLE 1

|  | RRC state |
| --- | --- |
| Immediate MDT | RRC_CONNECTED |
| Logged MDT | RRC_IDLE, RRC_INACTIVE |

The immediate MDT is characterized in that the UE 1e-25 immediately reports the collected information to the network. Since the information needs to be reported immediately, the immediate MDT can be performed by only a UE 1e-25 operating in the RRC connected mode. In general, radio resource management (RRM) measurement processes to support operations such as handover and serving cell addition are performed again, and location information, time information, etc., are additionally reported.

The logged MDT is characterized in that the collected information is stored without immediately being reported to the network, and the stored information is reported after the UE 1e-25 is switched to the RRC connected mode. In general, the logged MDT is performed by a UE in an RRC idle mode or RRC inactive mode, in which it is impossible to immediately report the collected information to the network. In the disclosure, the UE 1e-25 in an RRC inactive mode introduced in a next-generation mobile communication system performs the logged MDT. When the UE 1e-25 is in an RRC connected mode, the network provides configuration information for performing the logged MDT operation to the UE. After switching to the RRC idle mode or RRC inactive mode, the UE 1e-25 collects and stores the configuration information.

Figure 6:
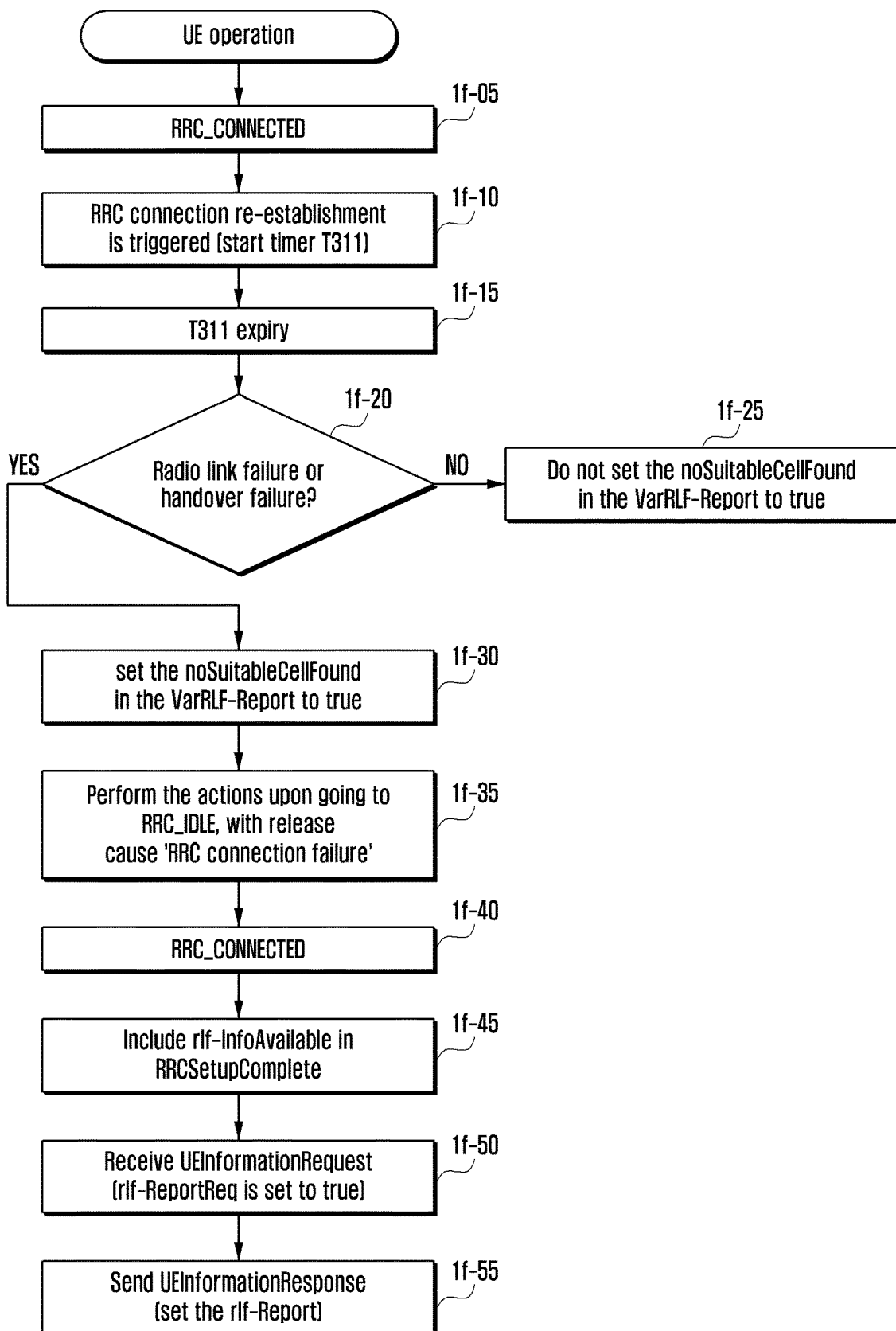
FIG. 6 is a flowchart illustrating a UE operation when a T311 timer expires in a new radio (NR) system.

FIG. 6 is a flowchart illustrating a UE operation when a T311 timer expires in an NR system.

Referring to FIG. 6, in step 1f-05, the UE is in an RRC connected mode (RRC_CONNECTED) by establishing an RRC connection with an NR base station.

In step 1f-10, the UE in the RRC connected mode initiates an RRC connection re-establishment procedure when the following predetermined conditions are satisfied.

Conditions:
When a radio link failure (RLF) is detected for a master cell group (MCG);
When re-configuration with sync failure or handover failure (HOF) occurs for an MCG;
When mobility from NR failure occurs;
When integrity check failure indication for signaling radio bearer 1 (SRB1) or SRB2 is received from a lower layer device (not applicable to RRCReestablishment message); and
When an RRC connection reconfiguration failure occurs.

In step 1f-10, if an RRC connection re-establishment procedure is initiated, the UE in the RRC connected mode drives a T311 timer. When a suitable NR cell is selected, the UE may stop the T311 timer.

The driven T311 timer expires in step 1f-15.

In step 1f-20, the UE in the RRC connected mode determines whether step 1f-10 was caused by the RLF or HOF.

If step 1f-10 occurred due to a predetermined condition other than the RLF or HOF, the UE does not set noSuitableCellFound in VarRLF-Report to true in step 1f-25. The T311 timer has expired because the UE cannot find or select a suitable NR cell, and thus, if the UE does not set noSuitableCellFound in the VarRLF-Report to true, the same may not be reported to the base station in the future.

However, if step 1f-10 occurred due to the RLF or HOF, the UE sets noSuitableCellFound in VarRLF-Report to true in step 1f-30.

In step 1f-35, the UE transitions to the RRC idle mode, and sets the cause for RRC connection release as "RRC connection failure".

In step 1f-40, the UE transitions to the RRC connected mode by establishing an RRC connection with an NR base station.

In step 1f-45, the UE in the RRC connected mode transmits an RRCSetupComplete message including rlf-InfoAvailable to the NR base station when the following predetermined conditions are satisfied.
If the UE includes RLF or HOF information available in VarRLF-Report, and if the registered PLMN (RPLMN) is included in plmn-IdentityList stored in VarRLF-Report.

In step 1f-50, the UE receives a UEInformationRequest message from the NR base station. If rlf-ReportReq, which indicates whether the terminal shall report information about the radio link failure is set to be true in the received UEInformationRequest message, the UE transmits a UEInformationResponse message including rlf-Report to the NR base station, in step 1f-55, when the following predetermined conditions are satisfied.
If the UE includes RLF or HOF information available in VarRLF-Report, and if the RPLMN is included in plmn-IdentityList stored in VarRLF-Report.

For reference, the UE operation of including the rlf-Report in the UEInformationResponse message may be performed as follows:
Set timeSinceFailure in VarRLF-Report to a time that has elapsed after the last RLF or HOF in NR;
Set the rlf-Report in the UEInformationResponse message to the value of rlf-Report in VarRLF-Report; and
Discard the rlf-Report from VarRLF-Report based on that successful delivery of the UEInformationResponse message is identified by lower layers.

Although the T311 timer is illustrated in the current embodiment, other types of timers may be used to perform operations according to the current embodiment.

Figure 7:
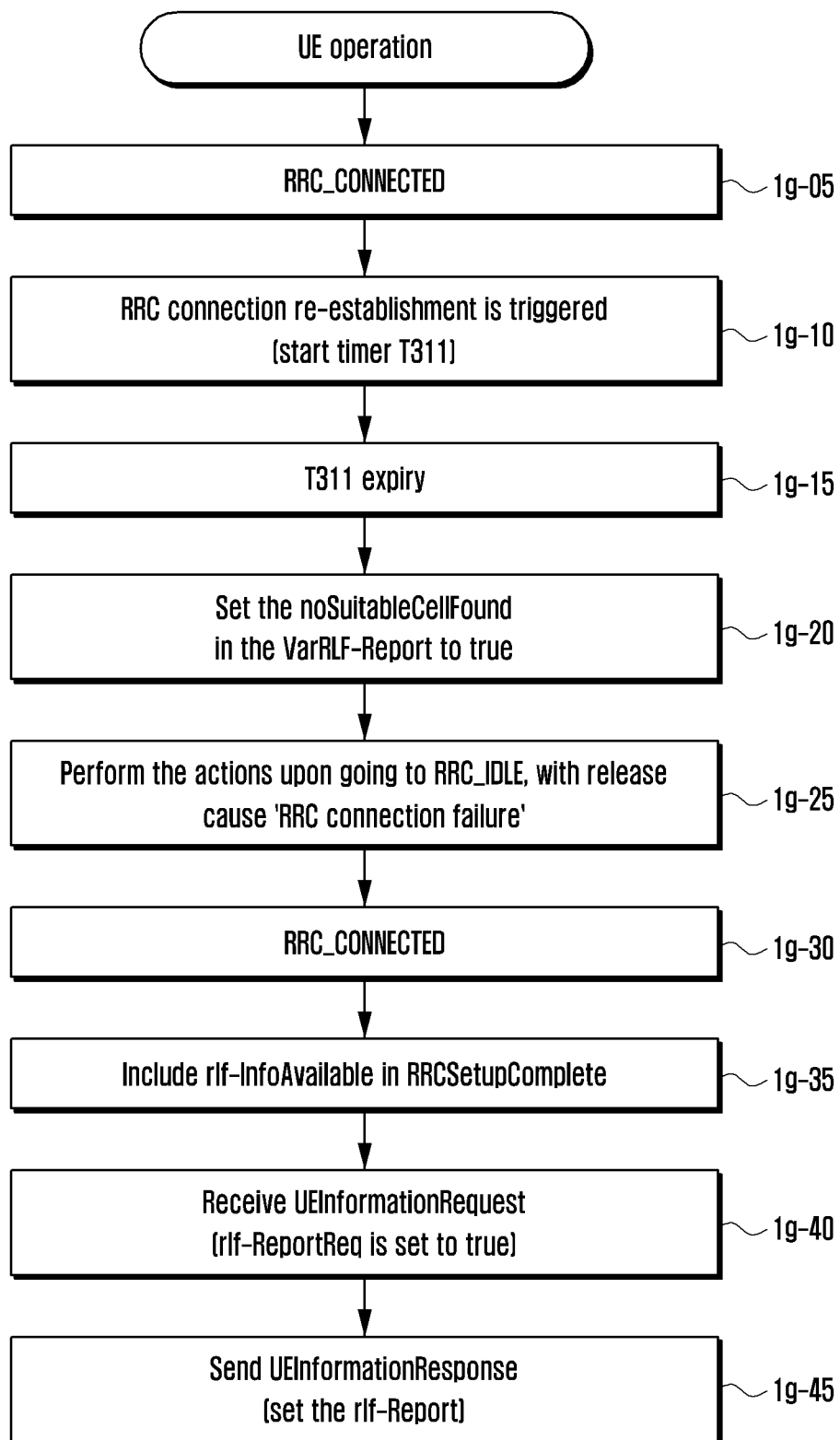
FIG. 7 is a flowchart illustrating a UE operation when a T311 timer expires in an NR system according to an embodiment.

FIG. 7 is a flowchart illustrating a UE operation when a T311 timer expires in an NR system according to an embodiment.

Referring to FIG. 7, in step 1g-05, the UE is in an RRC connected mode (RRC_CONNECTED) by establishing an RRC connection with an NR base station.

In step 1g-10, the UE in the RRC connected mode initiates an RRC connection re-establishment procedure when the following predetermined conditions are satisfied.
Conditions:
When an RLF is detected for an MCG;
When re-configuration with sync failure or HOF for an MCG occurs;
When mobility from NR failure occurs;
When an integrity check failure indication for SRB1 or SRB2 is received from a lower layer device (not applicable to RRCReestablishment message); and
When RRC connection reconfiguration failure occurs.

In step 1g-10, if an RRC connection re-establishment procedure is initiated, the UE in the RRC connected mode drives a T311 timer. When a suitable NR cell is selected, the UE may stop the T311 timer.

The driven T311 timer expires in step 1g-15.

In step 1g-20, the UE in the RRC connected mode sets noSuitableCellFound in VarRLF-Report to true. Unlike the operation illustrated in FIG. 6 and described above, in the embodiment of FIG. 7 noSuitableCellFound in the VarRLF-Report is set to be true even if step 1g-10 occurs due to a predetermined condition other than the RLF and HOF. The T311 timer expires because the UE cannot find a suitable NR cell, and thus, if the UE sets the noSuitableCellFound in the VarRLF-Report to true regardless of a predetermined condition by which step 1g-10 occurs and reports the same to the NR base station, the NR base station can establish more accurate and efficient network operation optimization.

In step 1g-25, the UE transitions to the RRC idle mode, and sets the cause for RRC connection release as "RRC connection failure".

In step 1g-30, the UE transitions to the RRC connected mode by establishing an RRC connection with an NR base station.

In step 1g-35, the UE in the RRC connected mode transmits an RRCSetupComplete message including rlf-InfoAvailable to the NR base station when the following predetermined conditions are satisfied.
If the UE includes RLF or HOF information available in VarRLF-Report, and if the RPLMN is included in plmn-IdentityList stored in VarRLF-Report.

In step 1g-40, the UE receives a UEInformationRequest message from the NR base station. If rlf-ReportReq is set to be true in the received UEInformationRequest message, the UE transmits a UEInformationResponse message including rlf-Report to the NR base station in step 1g-45 when the following predetermined conditions are satisfied.
If the UE includes RLF or HOF information available in VarRLF-Report, and if the RPLMN is included in plmn-IdentityList stored in VarRLF-Report For reference, the UE operation of including the rlf-Report in the UEInformationResponse message may be as follows:
Set timeSinceFailure in VarRLF-Report to a time that has elapsed after the last RLF or HOF in NR;
Set the rlf-Report in the UEInformationResponse message to the value of rlf-Report in VarRLF-Report; and
Discard the rlf-Report from VarRLF-Report based on that successful delivery of the UEInformationResponse message is identified by lower layers.

Although the T311 timer is utilized in FIG. 7, other types of timers may be used to perform the operation according to the current embodiment.

Figure 8:
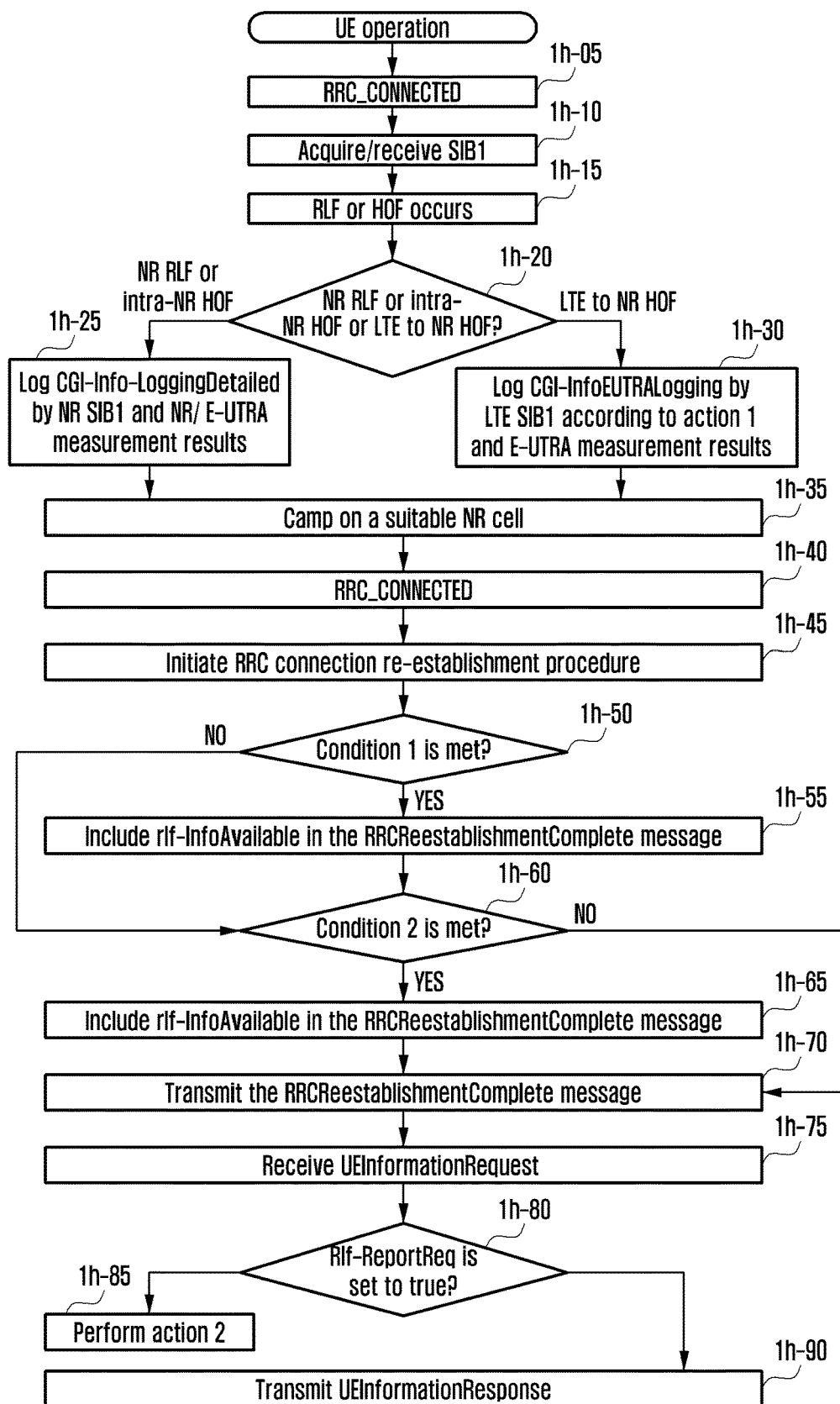
FIG. 8 is a flowchart illustrating a UE operation of collecting and reporting radio link failure information.

FIG. 8 is a flowchart illustrating a UE operation of collecting and reporting radio link failure information.

Referring to FIG. 8, in step 1h-05, the UE is in an RRC connected mode (RRC_CONNECTED) by establishing an RRC connection with an LTE base station or an NR base station.

In step 1h-10, the UE in the RRC connected mode receives SIB1.

In step 1h-15, the UE in the RRC connected mode experiences an RLF or HOF.

In step 1h-20, the UE determines whether an NR RLF, an intra-NR HOF, or an LTE to NR HOF have occurred.

When the NR RLF or intra-NR HOF has occurred in step 1h-20, the UE stores the following pieces of information in the VarRLF-Report by using NR SIB1 in step 1h-25.
PreviousPCellId may be logged as CGI-Info-LoggingDetailed by using information of NR SIB1.
When intra-NR HOF occurs, if a global cell identity (denoting the first plmn-identity in SIB1 and a cell identity mapped thereto) and tracking area code information exist for a target PCell in which a failed HO has occurred, failedPCellId may be logged as CGI-Info-LoggingDetailed by using the information of NR SIB1. Otherwise, the failedPCellId may be logged using a physical cell identifier and a carrier frequency for the cell.
A result of measurement for NR and E-UTRA in relation to RLF may be logged.

When LTE to NR HOF occurs in step 1h-20, the UE stores the following pieces of information in the VarRLF-Report by using LTE SIB1 in step 1h-30.
FailedPCellId-EUTRA may be logged as CGI-InfoEUTRALogging by using information of LTE SIB1.
A result of measurement for E-UTRA in relation to RLF may be logged. The result may be configured by OCTET STRING.

The UE according to an embodiment may log CGI-InfoEUTRALogging according to Action 1 below.
Action 1:
When only information related to EPC is broadcast to LTE SIB1,
Log the first plmn-Identity (plmn-Identity-eutra-epc) at plmn-IdentityList in LTE SIB1;
Log a cell identity (cellIdentity-eutra-epc), to which the first plmn-Identity belongs, at plmn-IdentityList in LTE SIB1; and
Log a tracking area code (trackingAreaCode-eutra-epc), to which the first plmn-Identity belongs, at plmn-IdentityList in LTE SIB1.
When both EPC-related information and 5GC-related information are broadcast to LTE SIB1,
Log, at plmn-Identity-eutra-epc, the first plmn-Identity of plmn-IdentityList in LTE SIB1;
Log a cell identity, to which the first plmn-Identity of plmn-IdentityList in LTE SIB1 belongs, at cellIdentity-eutra-epc;
Log a tracking area code, to which the first plmn-Identity of the plmn-IdentityList in LTE SIB1 belongs, at trackingAreaCode-eutra-epc;

Log, at plmn-Identity-eutra-5gc, the first plmn-Identity of plmn-IdentityList in LTE SIB1;

Log a cell identity, to which the first plmn-Identity of plmn-IdentityList in LTE SIB1 belongs, at cellIdentity-eutra-5gc; and Log a tracking area code, to which the first plmn-Identity of plmn-IdentityList in LTE SIB1 belongs, at trackingAreaCode-eutra-5gc.

When CGI-InfoEUTRALogging is logged according to Action 1, two problems may occur.

Problem 1: When both EPC-related information and 5GC-related information are broadcast to LTE SIB1, the UE always logs two pieces of information. Specifically, two pieces of information may denote plmn-Identity-eutra-epc, cellIdentity-eutra-epc, or tracking area code-epc; and plmn-Identity-eutra-5gc, cellIdentity-eutra-5gc, or tracking area code-epc.

Problem 2: When both EPC-related information and 5GC-related information are broadcast to LTE SIB1, the UE logs the same value rather than different values when logging two pieces of information.

In step 1h-35, the UE selects a suitable NR cell to camp thereon.

In step 1h-40, the UE establishes an RRC connection with the NR base station, and thus, transitions to the RRC connected mode.

In step 1h-45, the UE initiates an RRC connection re-establishment procedure. The UE may select a suitable NR cell, and may transmit an RRCReestablishmentRequest message to the NR base station. In response thereto, the NR base station may transmit an RRCReestablishment message to the UE.

In step 1h-50, the UE determines whether Condition 1 below is satisfied.

Condition 1: If the UE includes RLF or HOF information available in VarRLF-Report, and if the RPLMN is included in plmn-IdentityList stored in VarRLF-Report If Condition 1 is satisfied, the UE includes rlf-InfoAvailable in the RRCReestablishmentComplete message in step 1h-55.

In step 1h-60, the UE determines whether Condition 2 below is satisfied.

Condition 2: If the UE includes RLF or HOF information available in VarRLF-Report of higher layer signaling/an RRC signal, and if the UE is capable of cross-RAT RLF reporting and if the RPLMN is included in plmn-IdentityList stored in VarRLF-Report of higher layer signaling/an RRC signal When Condition 2 is satisfied, the UE includes rlf-InfoAvailable in the RRCReestablishmentComplete message in step 1h-65.

However, the UE may unnecessarily include rlf-InfoAvailable twice in the RRCReestablishmentComplete message due to the performance of Conditions 1 and 2.

In step 1h-70, the UE transmits an RRCReestablishment-Complete message to the NR base station.

In step 1h-75, the UE receives a UEInformationRequest message from the NR base station.

In step 1h-80, the UE determines whether rlf-ReportReq is set to be true in the received UEInformationRequest message. If rlf-ReportReq is set to be true in the received UEInformationRequest message, the UE may perform Action 2 in operation 1h-85.

Action 2:

If the UE includes RLF or HOF information available in VarRLF-Report and if the RPLMN is included in plmn-IdentityList stored in VarRLF-Report:

Set timeSinceFailure in VarRLF-Report to a time that has elapsed after the last RLF or HOF in NR;

Set the rlf-Report in the UEInformationResponse message to the value of rlf-Report in VarRLF-Report (if both nr-rlf-report and eutra-rlf-report are available, include nr-rlf-report, if nr-rlf-report only is available, include the nr-rlf-report, and if eutra-rlf-report only is available, include eutra-rlf-report); and Discard the rlf-Report from VarRLF-Report based on that successful delivery of the UEInformationResponse message is identified by lower layers In step 1h-90, the UE transmits UEInformationReponse to the NR base station.

Figure 9:
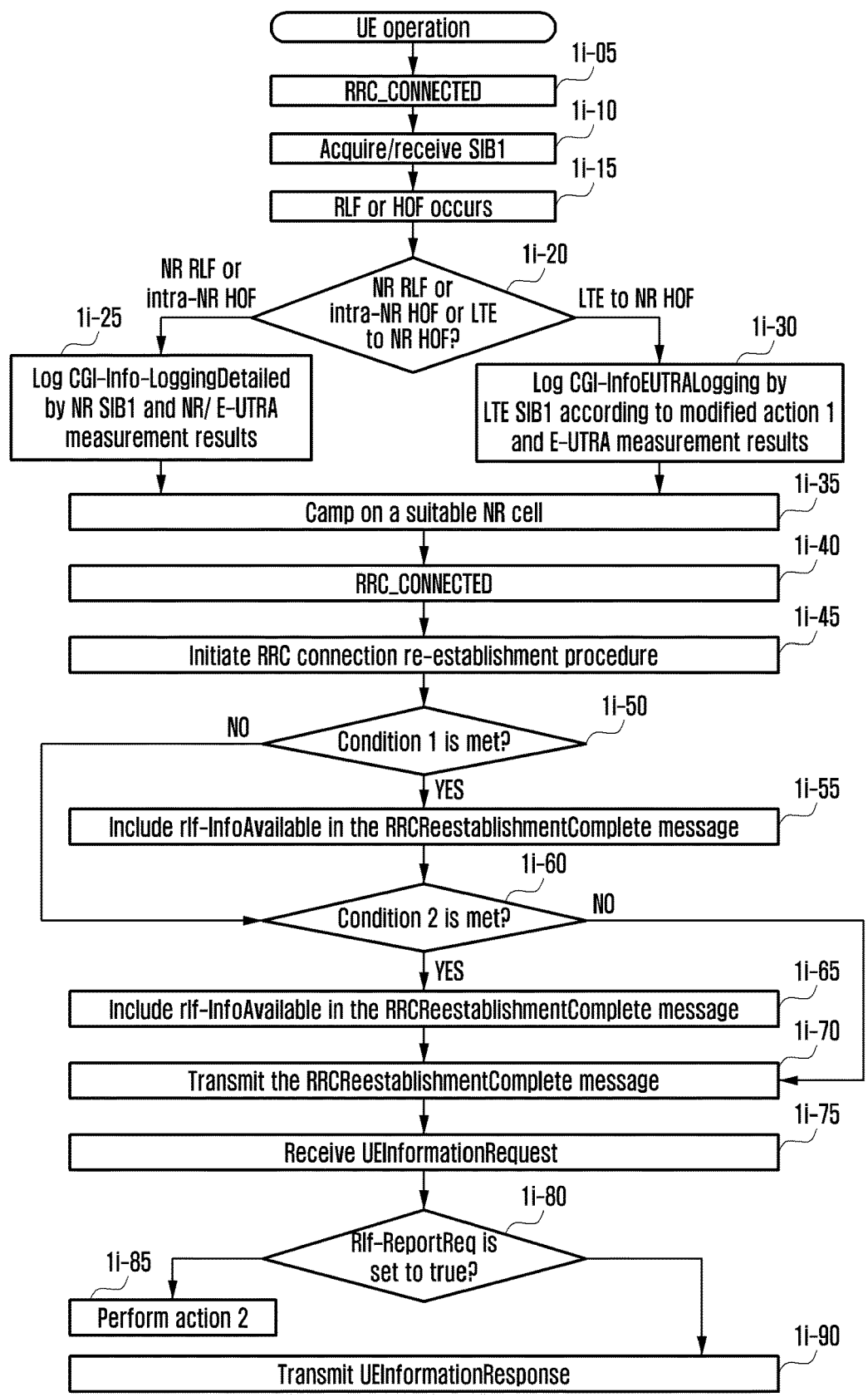
FIG. 9 is a flowchart illustrating a UE operation of collecting and reporting radio link failure information according to an embodiment.

FIG. 9 is a flowchart illustrating a UE operation of collecting and reporting radio link failure information in a system according to an embodiment.

Referring to FIG. 9, in step 1i-05, the UE is in an RRC connected mode (RRC_CONNECTED) by establishing an RRC connection with an LTE base station or an NR base station.

In step 1i-10, the UE in the RRC connected mode receives SIB1.

In step 1i-15, the UE in the RRC connected mode experiences an RLF or HOF.

In step 1i-20, the UE determines whether an NR RLF, an intra-NR HOF, or an LTE to NR HOF have occurred.

When the NR RLF or intra-NR HOF has occurred in step 1i-20, the UE stores the following pieces of information in the VarRLF-Report by using NR SIB1 in step 1i-25.

PreviousPCellId may be logged as CGI-Info-LoggingDetailed by using information of NR SIB1.

When intra-NR HOF occurs, if a global cell identity (denoting the first plmn-identity in SIB1 and a cell identity mapped thereto) and tracking area code information exist for a target PCell in which a failed HO has occurred, failedPCellId may be logged as CGI-Info-LoggingDetailed by using the information of NR SIB1. Otherwise, failedPCellId may be logged using a physical cell identifier and a carrier frequency for the cell.

A result of measurement for NR and E-UTRA in relation to RLF may be logged.

When LTE to NR HOF occurs in step 1i-20, the UE stores the following pieces of information in the VarRLF-Report by using LTE SIB1 in step 1i-30.

FailedPCellId-EUTRA may be logged as CGI-InfoEUTRALogging by using information of LTE SIB1.

A result of measurement for E-UTRA in relation to RLF may be logged. The result may be configured by OCTET STRING.

The UE may log CGI-InfoEUTRALogging according to modified Action 1 below.

Modified Action 1:

When only information related to EPC is broadcast to LTE SIB1,

Log the first plmn-Identity (plmn-Identity-eutra-epc) at the plmn-IdentityList in LTE SIB1;

Log a cell identity (cellIdentity-eutra-epc), to which the first plmn-Identity belongs, at the plmn-IdentityList in LTE SIB1; and Log a tracking area code (trackingAreaCode-eutra-epc), to which the first plmn-Identity belongs, at the plmn-IdentityList in LTE SIB1.

When both EPC-related information and 5GC-related information are broadcast to LTE SIB1, one of the following options may be performed.

Option 1: When the UE is connected to EPC with respect to an LTE cell

Log, at plmn-Identity-eutra-epc, the first plmn-Identity of plmn-IdentityList in LTE SIB1;
Log a cell identity, to which the first plmn-Identity of plmn-IdentityList in LTE SIB1 belongs, at cellIdentity-eutra-epc; and
Log a tracking area code, to which the first plmn-Identity of plmn-IdentityList in LTE SIB1 belongs, at trackingAreaCode-eutra-epc.

Option 2: When the UE is connected to 5GC with respect to an LTE cell
Log, at plmn-Identity-eutra-5gc, the first plmn-Identity of plmn-IdentityList-r15 in LTE SIB1;
Log a cell identity, to which the first plmn-Identity of the plmn-IdentityList-r15 in LTE SIB1 belongs, at cellIdentity-eutra-5gc; and
Log a tracking area code, to which the first plmn-Identity of the plmn-IdentityList-r15 in LTE SIB1 belongs, at trackingAreaCode-eutra-5gc.

Option 3: Option 1 and Option 2 log only one piece of information, but if both pieces of information need to be logged (e.g., when the base station wants to receive reporting of all pieces of the information),
Log, at plmn-Identity-eutra-epc, the first plmn-Identity of plmn-IdentityList in LTE SIB1;
Log a cell identity, to which the first plmn-Identity of the plmn-IdentityList in LTE SIB1 belongs, at cellIdentity-eutra-epc;
Log a tracking area code, to which the first plmn-Identity of the plmn-IdentityList in LTE SIB1 belongs, at trackingAreaCode-eutra-epc;
Log, at plmn-Identity-eutra-5gc, the first plmn-Identity at plmn-IdentityList-r15 in LTE SIB1;
Log a cell identity, to which the first plmn-Identity of plmn-IdentityList-r15 in LTE SIB1 belongs, at cellIdentity-eutra-5gc; and
Log a tracking area code, to which the first plmn-Identity of plmn-IdentityList-r15 in LTE SIB1 belongs, at trackingAreaCode-eutra-5gc.

In a case of logging CGI-InfoEUTRALogging according to the modified Action 1, the problem of FIG. 8 described above is solved, and the following advantages are provided.

Advantage 1: When both EPC-related information and 5GC-related information are broadcast to LTE SIB1, only one piece of information can be logged according to a type of core to which a UE is actually connected.

Advantage 2: When both EPC-related information and 5GC-related information are broadcast to LTE SIB1, information suitable for a type of core, to which a UE is actually connected, can be logged.

If CGI-InfoEUTRALogging is logged according to Option 1 or Option 2, the CGI-InfoEUTRALogging may include the following format.

TABLE 2

```
CGI-InfoEUTRALogging : := CHOICE {
    plmn-Identity-eutra-5gc         PLMN-Identity
                                    OPTIONAL,
    trackingAreaCode-eutra-5gc      TrackingAreaCode
                                    OPTIONAL,
    cellIdentity-eutra-5gc          BIT STRING (SIZE (28))
                                    OPTIONAL,
    plmn-Identity-eutra-epc         PLMN-Identity
                                    OPTIONAL,
    trackingAreaCode-eutra-epc      BIT STRING (SIZE (16))
                                    OPTIONAL,
    cellIdentity-eutra-epc          BIT STRING (SIZE (28))
                                    OPTIONAL
}
```

TABLE 3

CGI-InfoEUTRALogging field descriptions cellIdentity-eutra-epc, cellIdentity-eutra-5GC
Unambiguously identify a cell within a PLMN and it belongs the first PLMN entry in the plmn-IdentityList (when connected to EPC) or in the plmn-IdentityList-r15 (when connected to 5GC) in SystemInformationBlockType1.
plmn-Identity-eutra-epc, plmn-Identity-eutra-5GC
Identifies the PLMN of the cell as given by the first PLMN entry in the plmn-IdentityList (when connected to EPC) or in the plmn-IdentityList-r15 (when connected to 5GC) in SystemInformationBlockType1.
trackingAreaCode-eutra-epc, trackingAreaCode-eutra-5gc
Identifies the TAC as given by the first PLMN entry in the plmn-IdentityList (when connected to EPC) or in the plmn-IdentityList-r15 (when connected to 5GC) in SystemInformationBlockType1.

If CGI-InfoEUTRALogging is logged according to Option 3, the CGI-InfoEUTRALogging may include the following format.

TABLE 4

```
CGI-InfoEUTRALogging : := CHOICE {
    plmn-Identity-eutra-5gc         PLMN-Identity
                                    OPTIONAL,
    trackingAreaCode-eutra-5gc      TrackingAreaCode
                                    OPTIONAL,
    cellIdentity-eutra-5gc          BIT STRING (SIZE (28))
                                    OPTIONAL,
    plmn-Identity-eutra-epc         PLMN-Identity
                                    OPTIONAL,
    trackingAreaCode-eutra-epc      BIT STRING (SIZE (16))
                                    OPTIONAL,
    cellIdentity-eutra-epc          BIT STRING (SIZE (28))
                                    OPTIONAL
}
```

TABLE 5

CGI-InfoEUTRALogging field descriptions cellIdentity-eutra-epc, cellIdentity-eutra-5GC
Unambiguously identify a cell within a PLMN and it belongs the first PLMN entry in the plmn-IdentityList (when connected to EPC) or in the plmn-IdentityList-r15 (when connected to 5GC) in SystemInformationBlockType1.

TABLE 5-continued

CGI-InfoEUTRALogging field descriptions plmn-Identity-eutra-epc, plmn-Identity-eutra-5GC
Identifies the PLMN of the cell as given by the first PLMN entry in the plmn-IdentityList (when connected
to EPC) or in the plmn-IdentityList-r15 (when connected to 5GC) in SystemInformationBlockType1.
trackingAreaCode-eutra-epc, trackingAreaCode-eutra-5gc
Identifies the TAC as given by the first PLMN entry in the plmn-IdentltyList (when connected to EPC)
or in the plmn-IdentityList-r15 (when connected to 5GC) in SystemInformationBlockType1.

In step 1*i*-35, the UE selects a suitable NR cell to camp thereon.

In step 1*i*-40, the UE establishes an RRC connection with the NR base station, and thus, transitions to the RRC connected mode.

In step 1*i*-45, the UE initiates an RRC connection re-establishment procedure. The UE may select a suitable NR cell, and may transmit an RRCReestablishmentRequest message to the NR base station. In response thereto, the NR base station may transmit an RRCReestablishment message to the UE.

In step 1*i*-50, the UE determines whether Condition 1 below is satisfied.

Condition 1: If the UE includes RLF or HOF information available in VarRLF-Report, and if the RPLMN is included in plmn-IdentityList stored in VarRLF-Report If Condition 1 is satisfied, the UE includes rlf-InfoAvailable in the RRCReestablishmentComplete message in step 1*i*-55.

If Condition 1 is satisfied, the UE determines whether Condition 2 below is satisfied in step 1*i*-60.

Condition 2: If the UE includes RLF or HOF information available in VarRLF-Report of higher layer signaling/an RRC signal, and if the UE is capable of cross-RAT RLF reporting and if the RPLMN is included in plmn-IdentityList stored in VarRLF-Report of higher layer signaling/an RRC signal When Condition 2 is satisfied, the UE may include rlf-InfoAvailable in the RRCReestablishmentComplete message in step 1*i*-65.

A UE according to an embodiment does not identify whether Condition 2 is satisfied when Condition 1 above is satisfied. That is, since it is determined whether Condition 2 is satisfied only when Condition 1 is not satisfied, rlf-InfoAvailable may be included in the RRCReestablishment-Complete message only once.

For reference, the operation proposed above may be applied in the same manner when an RRCSetupComplete, an RRCResumeComplete message, and an RRCReconfigurationComplete message are transmitted to an NR base station.

In step 1*i*-70, the UE transmits an RRCReestablishment-Complete message to the NR base station.

In step 1*i*-75, the UE receives a UEInformationRequest message from the NR base station.

In step 1*i*-80, the UE determines whether rlf-ReportReq is set to be true in the received UEInformationRequest message. If rlf-ReportReq is set to be true in the received UEInformationRequest message, the UE performs Action 2 in step 1*i*-85.

Action 2:
If the UE includes RLF or HOF information available in VarRLF-Report, and if the RPLMN is included in plmn-IdentityList stored in VarRLF-Report:
Set timeSinceFailure in VarRLF-Report to a time that has elapsed after the last RLF or HOF in NR;

Set the rlf-Report in the UEInformationResponse message to the value of rlf-Report in VarRLF-Report (if both nr-rlf-report and eutra-rlf-report are available, include nr-rlf-report, and if nr-rlf-report only is available, include the nr-rlf-report);

Discard the rlf-Report from VarRLF-Report based on that successful delivery of the UEInformationResponse message is identified by lower layers;

On the contrary, if the UE includes RLF or HOF information available in VarRLF-Report of the higher layer signaling/an RRC signal, and if the RPLMN is included in plmn-IdentityList stored in VarRLF-Report of the higher layer signaling/RRC signal:

Set timeSinceFailure in VarRLF-Report of the higher layer signaling/RRC signal to a time that has elapsed after the last RLF or HOF in EUTRA;

Set the rlf-Report in the UEInformationResponse message to the value of rlf-Report in VarRLF-Report;

Discard the rlf-Report from VarRLF-Report based on that successful delivery of the UEInformationResponse message is identified by lower layers;

Discard the rlf-Report from VarRLF-Report of the higher layer signaling/RRC signal based on that successful delivery of the UEInformationResponse message is identified by lower layers.

In step 1*i*-90, the UE transmits UEInformationReponse to the NR base station.

Figure 10:
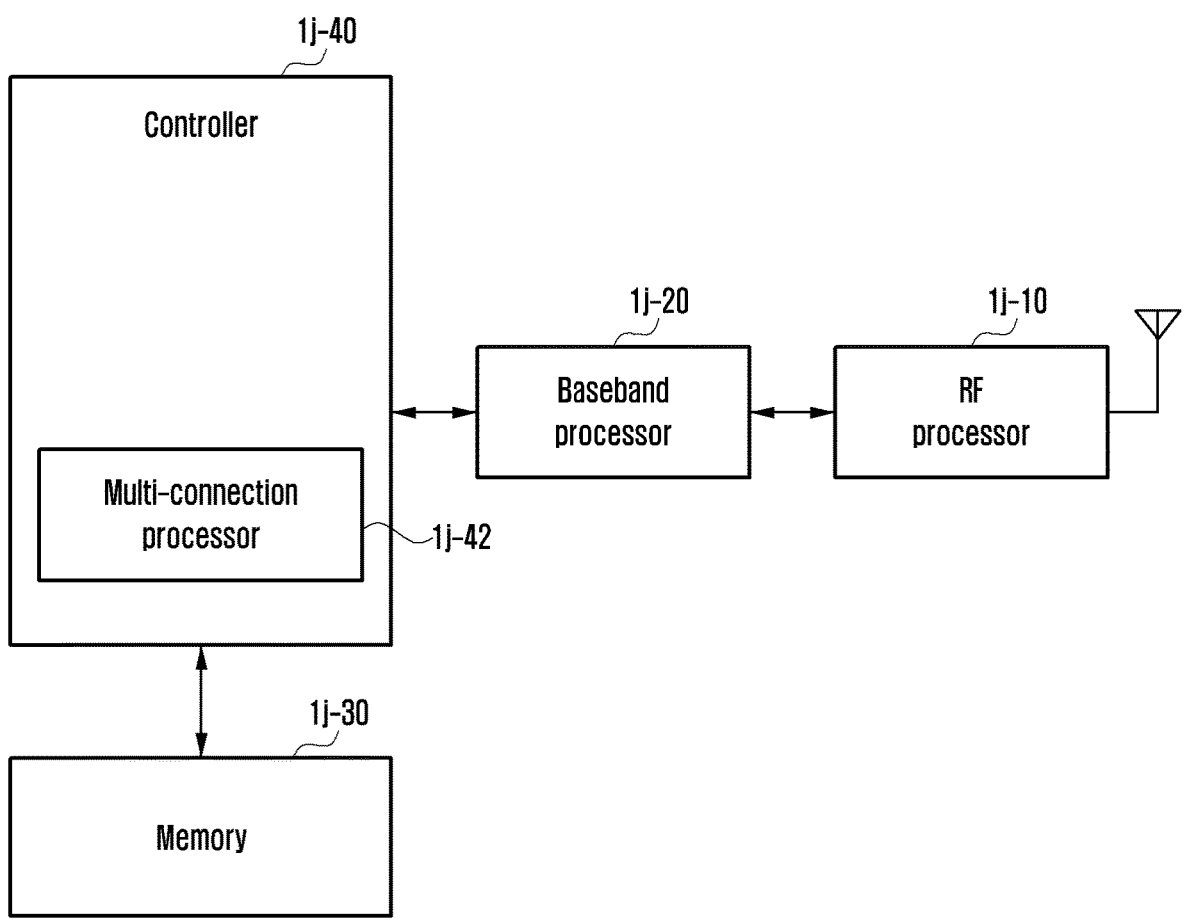
FIG. 10 illustrates a UE according to an embodiment.

FIG. 10 illustrates a UE according to an embodiment.

Referring to FIG. 10, the UE includes a radio frequency (RF) processor 1*j*-10, a baseband processor 1*j*-20, a memory 1*j*-30, and a controller 1*j*-40.

The RF processor 1*j*-10 performs a function for transmitting or receiving a signal through a radio channel, such as band conversion and amplification of a signal. That is, the RF processor 1*j*-10 up-converts a baseband signal provided from the baseband processor 1*j*-20 into an RF band signal and transmits the same through an antenna, and down-converts a RF band signal, received through the antenna, to a baseband signal. The RF processor 1*j*-10 may include a transmission filter, a reception filter, an amplifier, a mixer, an oscillator, a digital to analog converter (DAC), an analog to digital converter (ADC), etc. In FIG. 10, although only one antenna is shown, the UE may include a plurality of antennas.

In addition, the RF processor 1*j*-10 may include a plurality of RF chains. The RF processor 1*j*-10 may perform beamforming. For the beamforming, the RF processor 1*j*-10 may control a phase and a size of each signal transmitted or received through a multiple of antennas or antenna elements. In addition, the RF processor 1*j*-10 may perform MIMO, and may receive multiple layers in the case of performing the MIMO operation.

The baseband processor 1*j*-20 performs a function for a conversion between a baseband signal and a bit string according to a physical layer standard of the system. If data is transmitted, the baseband processor 1*j*-20 generates complex symbols by encoding and modulating a transmission bit string. In addition, if data is received, the baseband processor 1*j*-20 reconstructs the received bit string by demodulating and decoding the baseband signal provided from the RF processor 1*j*-10. For example, in an OFDM scheme, if data is transmitted, the baseband processor 1*j*-20 generates complex symbols by encoding and modulating a transmission bit string, mapping the complex symbols to subcarriers, and then configures OFDM symbols through an inverse fast Fourier transform (IFFT) operation and a cyclic prefix (CP) insertion. Further, if data is received, the baseband processor 1*j*-20 divides the baseband signal provided from the RF processor 1*j*-10 in units of OFDM symbols, reconstructs the signals mapped to the subcarriers through a fast Fourier transform (FFT) operation, and then reconstructs a reception bit string through demodulation and decoding.

The baseband processor 1*j*-20 and the RF processor 1*j*-10 transmit and receive signals as described above. Accordingly, the baseband processor 1*j*-20 and the RF processor 1*j*-10 may be referred to as a transmitter, a receiver, a transceiver, or a communication unit.

Further, at least one of the baseband processor 1*j*-20 and the RF processor 1*j*-10 may include a plurality of communication modules to support different radio access technologies. At least one of the baseband processor 1*j*-20 and the RF processor 1*j*-10 may include different communication modules to process signals of different frequency bands. The different radio access technologies may include a wireless local area network (LAN) (e.g., IEEE 802.11), a cellular network (e.g., LTE), etc. In addition, the different frequency bands may include super high frequency (SHF) (e.g., 2.NRHz and NRHz) bands and millimeter (mm) wave (e.g., 60 GHz) bands.

The memory 1*j*-30 stores data, such as a basic program, an application program, and configuration information for the operation of the UE. In particular, the memory 1*j*-30 may store information related to a second access node at which wireless communication using a second wireless access technology is performed. In addition, the memory 1*j*-30 provides stored data at the request of the controller 1*j*-40.

The controller 1*j*-40 controls overall operations of the UE. For example, the controller 1*j*-40 transmits or receives a signal through the baseband processor 1*j*-20 and the RF processor 1*j*-10. The controller 1*j*-40 records and reads data in and from the memory 1*j*-30. To this end, the controller 1*j*-40 may include at least one processor. The controller 1*j*-40 may include a communication processor for performing a control for communication, and an application processor (AP) for controlling a higher layer such as an application program.

Figure 11:
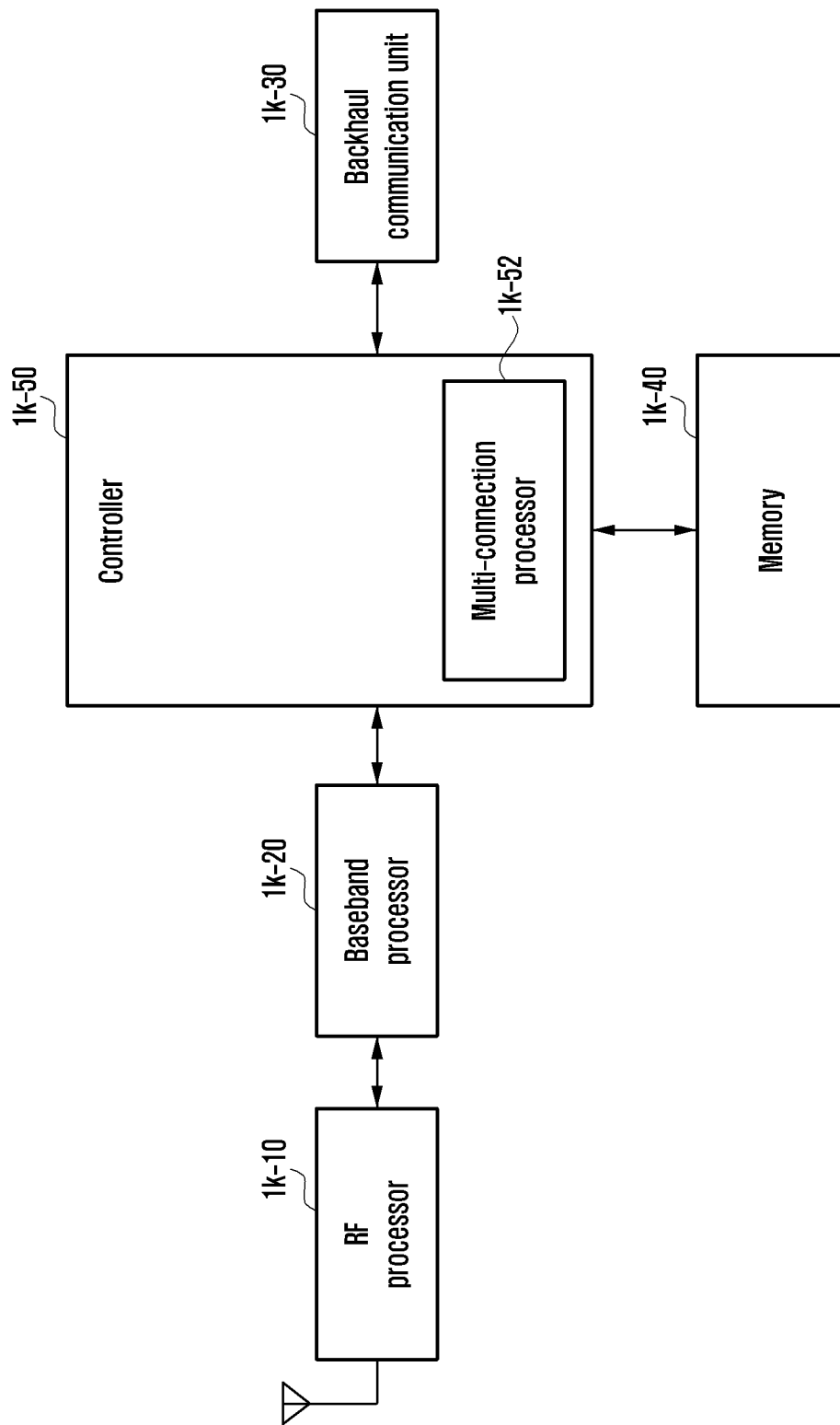
FIG. 11 illustrates an NR base station according to an embodiment.

FIG. 11 illustrates an NR base station according to an embodiment.

Referring to FIG. 11, the base station includes an RF processor 1*k*-10, a baseband processor 1*k*-20, a backhaul communication unit 1*k*-30, a memory 1*k*-40, and a controller 1*k*-50.

The RF processor 1*k*-10 performs a function for transmitting or receiving a signal through a radio channel, such as band conversion and amplification of a signal. That is, the RF processor 1*k*-10 up-converts a baseband signal provided from the baseband processor 1*k*-20 into an RF band signal and then transmits the converted signal through an antenna, and down-converts an RF band signal received through the antenna into a baseband signal. The RF processor 1*k*-10 may include a transmission filter, a reception filter, an amplifier, a mixer, an oscillator, a DAC, and an ADC. In FIG. 11, although only one antenna is shown, the first access node may include a plurality of antennas. In addition, the RF processor 1*k*-10 may include a plurality of RF chains. The RF processor 1*k*-10 may perform beamforming. For the beamforming, the RF processor 1*k*-10 may control a phase and a size of each of the signals transmitted or received through a multiple of antennas or antenna elements. The RF processor may perform a downlink MIMO operation by transmitting one or more layers.

The baseband processor 1*k*-20 performs a function of a conversion between the baseband signal and the bit string according to the physical layer standard of the first RAT. If data is transmitted, the baseband processor 1*k*-20 generates complex symbols by encoding and modulating a transmission bit string. If data is received, the baseband processor 1*k*-20 reconstructs the received bit string by demodulating and decoding the baseband signal provided from the RF processor 1*k*-10. For example, according to an OFDM scheme, if data is transmitted, the baseband processor 1*k*-20 may generate complex symbols by encoding and modulating the transmission bit string, map the complex symbols to subcarriers, and then configure OFDM symbols through an IFFT operation and CP insertion. If data is received, the baseband processor 1*k*-20 divides the baseband signal provided from the RF processor 1*k*-10 in units of OFDM symbols, reconstructs the signals mapped to the subcarriers through an FFT operation, and then reconstructs a reception bit string through demodulation and decoding. The baseband processor 1*k*-20 and the RF processor 1*k*-10 transmit and receive signals as described above. Accordingly, the baseband processor 1*k*-20 and the RF processor 1*k*-10 may be referred to as a transmitter, a receiver, a transceiver, a communication unit, or a wireless communication unit.

The backhaul communication unit 1*k*-30 provides an interface for communicating with other nodes in the network. The backhaul communication unit 1*k*-30 converts a bit string, transmitted from the main station to another node, e.g., an auxiliary base station, a core network, etc., into a physical signal, and converts the physical signal received from the other node into a bit string.

The memory 1*k*-40 stores data, such as a basic program, an application program, and configuration information for the operation of a main base station. In particular, the memory 1*k*-40 may store information on a bearer allocated to a connected UE, a measurement result reported from the connected UE, etc. In addition, the memory 1*k*-40 may store information that is a criterion for determining whether to provide or terminate multi-connection to the UE. The memory 1*k*-40 provides stored data at the request of the controller 1*k*-50.

The controller 1*k*-50 controls the overall operations of the main base station. The controller 1*k*-50 transmits or receives a signal through the baseband processor 1*k*-20 and the RF processor 1*k*-10 or through a backhaul communication unit 1*k*-30. In addition, the controller 1*k*-50 records and reads data in and from the memory 1*k*-40. To this end, the controller 1*k*-50 may include at least one processor.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:
   receiving, from a first base station of a first radio access technology (RAT), a user equipment (UE) information request message; and
   in case that the UE information request message includes information indicating to transmit a radio link failure (RLF) report, transmitting, to the first base station of the first RAT, a UE information response message including the RLF report, the RLF report including logging information for a cell of a second RAT, and the cell being where the RLF is detected or being a source cell of a failed handover,
   wherein the logging information includes a public land mobile network (PLMN) identity identified based on a first PLMN entry of a PLMN identity list, the PLMN identity list corresponding to a core network of the second RAT to which the cell is connected, and
   wherein the PLMN identity list is included in system information received from a second base station associated with the cell.

2. The method of claim 1, further comprising:
   identifying whether the terminal has first RLF information or first handover failure information associated with the first RAT, based on the information included in the UE information request message;
   in case that the terminal does not have the first RLF information or the first handover failure information, identifying whether the terminal has second RLF information or second handover failure information associated with the second RAT, based on the terminal being capable of cross-RAT RLF reporting; and
   in case that the terminal has the second RLF information or the second handover failure information associated with the second RAT, setting the RLF report in the UE information response message based on the second RLF information or the second handover failure information.

3. The method of claim 1, further comprising transmitting, to the first base station of the first RAT, a radio resource control (RRC) message for an RRC connection with the first base station,
   wherein the RRC message includes an indication that the terminal has available RLF information for the RLF report, and
   wherein the UE information request message is received based on the RRC message.

4. The method of claim 3, wherein the indication is included in the RRC message, in case that the terminal has first RLF information or first handover failure information associated with the first RAT or in case that the terminal does not have the first RLF information or the first handover failure information and the terminal, which is capable of cross-RAT RLF reporting, has second RLF information or second handover failure information associated with the second RAT.

5. The method of claim 1, wherein the logging information further includes at least one of an identity of the cell and a tracking area code to which the cell belongs, and wherein the first RAT is new radio (NR), and the second RAT is an evolved-universal mobile telecommunication system (UMTS) terrestrial radio access (E-UTRA).

6. A method performed by a first base station of a first radio access technology (RAT) in a wireless communication system, the method comprising:
   transmitting, to a terminal, a user equipment (UE) information request message; and
   in case that the UE information request message includes information indicating to transmit a radio link failure (RLF) report, receiving, from the terminal, a UE information response message including the RLF report, the RLF report including logging information for a cell of a second RAT, and the cell being where the RLF is detected or being a source cell of a failed handover,
   wherein the logging information includes a public land mobile network (PLMN) identity identified based on a first PLMN entry of a PLMN identity list, the PLMN identity list corresponding to a core network of the second RAT to which the cell is connected, and
   wherein the PLMN identity list is included in system information transmitted from a second base station associated with the cell to the terminal.

7. The method of claim 6, wherein, in case that the terminal does not have first RLF information or first handover failure information associated with the first RAT, the RLF report in the UE information response message is set based on second RLF information or second handover failure information associated with the second RAT stored in the terminal, and
   wherein the terminal is capable of cross-RAT RLF reporting.

8. The method of claim 6, further comprising receiving, from the terminal, a radio resource control (RRC) message for an RRC connection with the first base station,
   wherein the RRC message includes an indication that the terminal has available RLF information for the RLF report, and
   wherein the UE information request message is transmitted based on the RRC message.

9. The method of claim 8, wherein the indication is included in the RRC message, in case that the terminal has first RLF information or first handover failure information associated with the first RAT or in case that the terminal does not have the first RLF information or the first handover failure information and the terminal, which is capable of cross-RAT RLF reporting, has second RLF information or second handover failure information associated with the second RAT.

10. The method of claim 6, wherein the logging information further includes at least one of an identity of the cell and a tracking area code to which the cell belongs, and
    wherein the first RAT is new radio (NR), and the second RAT is an evolved-universal mobile telecommunication system (UMTS) terrestrial radio access (E-UTRA).

11. A terminal in a wireless communication system, the terminal comprising:
    a transceiver; and
    a controller configured to:
       control the transceiver to receive, from a first base station of a first radio access technology (RAT), a user equipment (UE) information request message, and
       in case that the UE information request message includes information indicating to transmit a radio link failure (RLF) report, control the transceiver to transmit, to the first base station of the first RAT, a UE information response message including the RLF report, the RLF report including logging information for a cell of a second RAT, and the cell being where the RLF is detected or being a source cell of a failed handover, wherein the logging information includes a public land mobile network (PLMN) identity identified based on a first PLMN entry of a PLMN identity list, the PLMN identity list corresponding to a core network of the second RAT to which the cell is connected, and wherein the PLMN identity list is included in system information received from a second base station associated with the cell.

12. The terminal of claim 11, wherein the controller is further configured to:
identify whether the terminal has first RLF information or first handover failure information associated with the first RAT, based on the information included in the UE information request message,
in case that the terminal does not have the first RLF information or the first handover failure information, identify whether the terminal has second RLF information or second handover failure information associated with the second RAT, based on the terminal being capable of cross-RAT RLF reporting, and
in case that the terminal has the second RLF information or the second handover failure information associated with the second RAT, set the RLF report in the UE information response message based on the second RLF information or the second handover failure information.

13. The terminal of claim 11, wherein the controller is further configured to control the transceiver to transmit, to the first base station of the first RAT, a radio resource control (RRC) message for an RRC connection with the first base station,
wherein the RRC message includes an indication that the terminal has available RLF information for the RLF report, and
wherein the UE information request message is received based on the RRC message.

14. The terminal of claim 13, wherein the indication is included in the RRC message, in case that the terminal has first RLF information or first handover failure information associated with the first RAT or in case that the terminal does not have the first RLF information or the first handover failure information and the terminal, which is capable of cross-RAT RLF reporting, has second RLF information or second handover failure information associated with the second RAT.

15. The terminal of claim 11, wherein the logging information further includes at least one of an identity of the cell and a tracking area code to which the cell belongs, and
wherein the first RAT is new radio (NR), and the second RAT is an evolved-universal mobile telecommunication system (UMTS) terrestrial radio access (E-UTRA).

16. A first base station of a first radio access technology (RAT) in a wireless communication system, the first base station comprising:
a transceiver; and
a controller configured to:
control the transceiver to transmit, to a terminal, a user equipment (UE) information request message, and
in case that the UE information request message includes information indicating to transmit a radio link failure (RLF) report, control the transceiver to receive, from the terminal, a UE information response message including the RLF report, the RLF report including logging information for a cell of a second RAT, and the cell being where the RLF is detected or being a source cell of a failed handover,
wherein the logging information includes a public land mobile network (PLMN) identity identified based on a first PLMN entry of a PLMN identity list, the PLMN identity list corresponding to a core network of the second RAT to which the cell is connected, and
wherein the PLMN identity list is included in system information transmitted from a second base station associated with the cell to the terminal.

17. The first base station of claim 16, wherein, in case that the terminal does not have first RLF information or first handover failure information associated with the first RAT, the RLF report in the UE information response message is set based on second RLF information or second handover failure information associated with the second RAT stored in the terminal, and
wherein the terminal is capable of cross-RAT RLF reporting.

18. The first base station of claim 16, wherein the controller is further configured to control the transceiver to receive, from the terminal, a radio resource control (RRC) message for an RRC connection with the first base station,
wherein the RRC message includes an indication that the terminal has available RLF information for the RLF report, and
wherein the UE information request message is transmitted based on the RRC message.

19. The first base station of claim 18, wherein the indication is included in the RRC message, in case that the terminal has first RLF information or first handover failure information associated with the first RAT or in case that the terminal does not have the first RLF information or the first handover failure information and the terminal, which is capable of cross-RAT RLF reporting, has second RLF information or second handover failure information associated with the second RAT.

20. The first base station of claim 16, wherein the logging information further includes at least one of an identity of the cell and a tracking area code to which the cell belongs, and
wherein the first RAT is new radio (NR), and the second RAT is an evolved-universal mobile telecommunication system (UMTS) terrestrial radio access (E-UTRA).

* * * * *